(12) United States Patent
Teraue (10) Patent No.: US 8,861,024 B2
(45) Date of Patent: Oct. 14, 2014

(54) PRINT COLOR MANAGING APPARATUS, PRINT COLOR MANAGING METHOD, AND RECORDING MEDIUM

(75) Inventor: Eiji Teraue, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 138 days.

(21) Appl. No.: 13/405,873

(22) Filed: Feb. 27, 2012

(65) Prior Publication Data

US 2012/0250044 A1    Oct. 4, 2012

(30) Foreign Application Priority Data

Mar. 31, 2011    (JP) .................................. 2011-081185

(51) Int. Cl.
*H04N 1/60*    (2006.01)
*H04N 1/46*    (2006.01)
*G03F 3/10*    (2006.01)
*H04N 1/40*    (2006.01)

(52) U.S. Cl.
CPC ......... *H04N 1/6033* (2013.01); *H04N 1/40006* (2013.01)
USPC .............................. 358/1.9; 358/504; 358/527

(58) Field of Classification Search
USPC .................... 358/1.9, 1.15, 2.1, 504, 527, 406
See application file for complete search history.

(56) References Cited

U.S. PATENT DOCUMENTS

| 7,079,270 B2 * | 7/2006 | Kiyosu et al. ................ 358/1.15 |
| 2002/0113984 A1 | 8/2002 | Nakajima et al. |
| 2008/0055666 A1 | 3/2008 | Gila et al. |
| 2008/0088891 A1 | 4/2008 | Shiraishi |

FOREIGN PATENT DOCUMENTS

| EP | 0 741 491 A2 | 11/1996 |
| JP | 2002-218243 A | 8/2002 |
| JP | 2003-224732 A | 8/2003 |
| JP | 2004-112470 A | 4/2004 |
| JP | 2005-153289 A | 6/2005 |
| JP | 2005-244519 A | 9/2005 |
| JP | 2007-174379 A | 7/2007 |
| JP | 2008-254248 A | 10/2008 |
| JP | 2009-10499 A | 1/2009 |

OTHER PUBLICATIONS

Extended European Search Report dated Apr. 23, 2012 issued in corresponding European Patent Application No. 12157268.9.
Japanese Office Action, dated May 7, 2013, for Japanese Application No. 2011-081185.
Office Action dated Nov. 1, 2013, issued in corresponding European Patent Application No. 12 157 268.9.

* cited by examiner

*Primary Examiner* — Charlotte M Baker
(74) *Attorney, Agent, or Firm* — Birch, Stewart, Kolasch & Birch (57) ABSTRACT

Color management conditions concerning management of color accuracy in a printing apparatus are set, and colorimetric values of color patches printed as color specimens by the printing apparatus are acquired in association with a printing time of the color patches. An execution period for a calibration process on the printing apparatus is determined based on a plurality of colorimetric values, which are acquired at a plurality of printing times, and the color management conditions, which have been set.

11 Claims, 10 Drawing Sheets

| COLOR PATCH | COLOR | L* | a* | b* |
|---|---|---|---|---|
| 32a | Paper | 93 | 0 | -3 |
| 32b | K | 16 | 0 | 0 |
| 32c | C | 54 | -36 | -49 |
| 32d | M | 46 | 72 | -5 |
| 32e | Y | 88 | -6 | 90 |
| 32f | M+Y | 47 | 66 | 50 |
| 32g | C+Y | 49 | -66 | 33 |
| 32h | C+M | 20 | 25 | -48 |
| 32i | C+M+Y | 18 | 3 | 0 |

| STANDARD JUDGMENT TOOL | | | | | |
|---|---|---|---|---|---|
| JUDGMENT DAY AND TIME | 2011/03/01 15:30:45 | | . . . . . . . | | |

| JUDGING CONDITIONS: ISO12647-7 | | | | | | | |
|---|---|---|---|---|---|---|---|
| ALL PATCHES | AVERAGE | 3.0 | 2.1 | ○ | ○ | ○ | |
| | MAXIMUM COLOR DIFFERENCE | 6.0 | 4.5 | | ○ | | |
| PAPER | WHITE POINTS | 3.0 | 1.8 | ○ | × | ○ | ○ |
| PRIMARY COLORS | AVERAGE | 5.0 | 3.1 | | | | |
| | CYAN | 5.0 | 5.4 | | | | |
| | MAGENTA | 5.0 | 1.1 | | | | |
| | YELLOW | 5.0 | 1.5 | | | | |
| | BLACK | 5.0 | 1.9 | | | | |
| SECONDARY COLORS | . . . | | | | | | |

PRINT COLOR MANAGING APPARATUS, PRINT COLOR MANAGING METHOD, AND RECORDING MEDIUM

CROSS-REFERENCE TO RELATED APPLICATION

This application is based upon and claims the benefit of priority from Japanese Patent Application No. 2011-081185 filed on Mar. 31, 2011, of which the contents are incorporated herein by reference.

BACKGROUND OF THE INVENTION

1. Field of the Invention

The present invention relates to a print color managing apparatus, a print color managing method, and a recording medium storing therein a program for performing management of color accuracy in a printing device.

2. Description of the Related Art

Heretofore, it has been attempted in the field of offset printing to operate a printing device in accordance with domestic and international standards in an effort to achieve better printing quality control. According to ISO (International Standard Organization) 12647-2, allowable errors, tone curves, etc., are enumerated as items for evaluating the management of color accuracy.

Recently, the importance of managing colors accurately in accordance with standards such as ISO standards has also been acknowledged with respect to proofs in a printing system for producing prints directly from digital data (so-called "digital printing").

In order to continuously produce stable prints with few color variation errors, it is effective to incorporate an automatic calibration means into a printing device. Such an automatic calibration means periodically monitors the color of a print, and automatically performs a color feedback correction control process on the monitored color. More specifically, the automatic calibration means acquires data of a color sample repeatedly at given intervals, calculates the color difference between the acquired data and a target value for the color sample, and corrects the color of the print in order to cancel the color difference.

Japanese Laid-Open Patent Publication No. 2004-112470 discloses an apparatus for and a method of automatically performing a calibration process using data that is read by a sensor in an apparatus. The publication states that the apparatus determines whether or not the calibration process should be carried out, depending on a deviation of the read data for each print job, each day, or each month, for example.

Japanese Laid-Open Patent Publication No. 2003-224732 discloses an image forming apparatus incorporating an image reading apparatus, which has an automatic calibration means.

SUMMARY OF THE INVENTION

Printing systems have different configurations depending on the scale of printers that utilize the printing systems, and the locations where such printing systems are installed. Processes for managing color accuracy and standards for managing color accuracy may not necessarily be uniform, but may differ depending on attributes of the printing device and purposes for which the printing device are used.

According to Japanese Laid-Open Patent Publication No. 2004-112470 and Japanese Laid-Open Patent Publication No. 2003-224732, it is difficult for the user to make flexible settings for the calibration process, because an error is calculated at the present time, and it is determined therefrom whether or not the calibration process should be performed based on the calculated error.

In the case that similar management of color accuracy is to be performed on a printing device with no automatic calibration means, the user may make periodic colorimetric measurements of a control strip, and then determine whether or not a calibration process should be carried out based on the results of such colorimetric measurements. However, if the colorimetric measurements are made at short intervals, then the user may find the printing process and the colorimetric measurement process too troublesome to perform. Further, if such colorimetric measurements are taken over long intervals, the user may overlook abnormal states, which fall out of a color management range.

It is an object of the present invention to provide a print color managing apparatus, a print color managing method, and a recording medium storing therein a program, which makes it possible to perform a flexible calibration process regardless of the configuration of a printing device.

According to the present invention, there is provided a print color managing apparatus comprising a color management condition setting section for setting color management conditions concerning management of color accuracy in a printing apparatus, a colorimetric data acquirer for acquiring colorimetric values of color patches printed as color specimens by the printing apparatus in association with a printing time of the color patches, and an execution period determiner for determining an execution period for a calibration process on the printing apparatus based on a plurality of colorimetric values, which are acquired at a plurality of printing times by the colorimetric data acquirer, and the color management conditions, which are set by the color management condition setting section.

Since the print color managing apparatus includes the execution period determiner, which determines an execution period for a calibration process on the printing apparatus based on a plurality of colorimetric values, which are acquired at a plurality of printing times by the colorimetric data acquirer, and the color management conditions, a rough indication of the execution time for executing a calibration process is obtained while taking into account color variation characteristics of an actual print. Since an indication as to not only whether a calibration process needs to be carried out at present, but also whether a calibration process needs to be carried out in the future is made available to the user, the user finds it highly convenient in planning calibration processes. Accordingly, flexible settings for calibration processes can be provided, regardless of the configuration of a printing system that incorporates the printing apparatus therein.

Preferably, the color management condition setting section sets the color management conditions depending on usage and/or standards of the printing apparatus.

Preferably, the print color managing apparatus further comprises a period display image generator for generating a period display image, which displays the execution period determined by the execution period determiner.

Preferably, the print color managing apparatus further comprises a display unit for displaying the period display image generated by the period display image generator.

Preferably, the print color managing apparatus further comprises a match/non-match judging section for determining whether at least one of the colorimetric values acquired by the colorimetric data acquirer matches the color management conditions, and a result display image generator for generating a result display image, which includes visual judgment results produced by the match/non-match judging section.

Preferably, the print color managing apparatus further comprises a display unit for displaying the result display image generated by the result display image generator.

Preferably, the execution period determiner determines the execution period from predictive curves generated based on the plurality of printing times and the plurality of colorimetric values.

According to the present invention, there also is provided a print color managing method comprising the steps of setting color management conditions concerning management of color accuracy in a printing apparatus, acquiring colorimetric values of color patches printed as color specimens by the printing apparatus in association with a printing time of the color patches, and determining an execution period for a calibration process on the printing apparatus based on a plurality of colorimetric values, which are acquired at a plurality of printing times, and the color management conditions, which have been set.

According to the present invention, there is further provided a recording medium storing a program for managing the accuracy of print colors, the program enabling a computer to function as a color management condition setting section for setting color management conditions concerning management of color accuracy in a printing apparatus, a colorimetric data acquirer for acquiring colorimetric values of color patches printed as color specimens by the printing apparatus in association with a printing time of the color patches, and an execution period determiner for determining an execution period for a calibration process on the printing apparatus based on a plurality of colorimetric values, which are acquired at a plurality of printing times by the colorimetric data acquirer, and the color management conditions, which are set by the color management condition setting section.

With the print color managing apparatus, the print color managing method, and the recording medium according to the present invention, an execution period for a calibration process on the printing apparatus is determined based on a plurality of colorimetric values, which are acquired at a plurality of printing times, and the color management conditions. Further, a rough indication of the execution time for executing a calibration process is obtained while taking into account the color variation characteristics of an actual print. Since an indication as to not only whether a calibration process needs to be carried out at present, but also whether a calibration process needs to be carried out in the future is made available to the user, the user finds it highly convenient in planning calibration processes. Accordingly, flexible settings for calibration processes can be provided regardless of the configuration of a printing system that incorporates the printing apparatus therein.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A print color managing method according to a preferred embodiment of the present invention in relation to a print color managing apparatus and a printing system for carrying out the print color managing method will be described in detail below with reference to the accompanying drawings.

Figure 1:
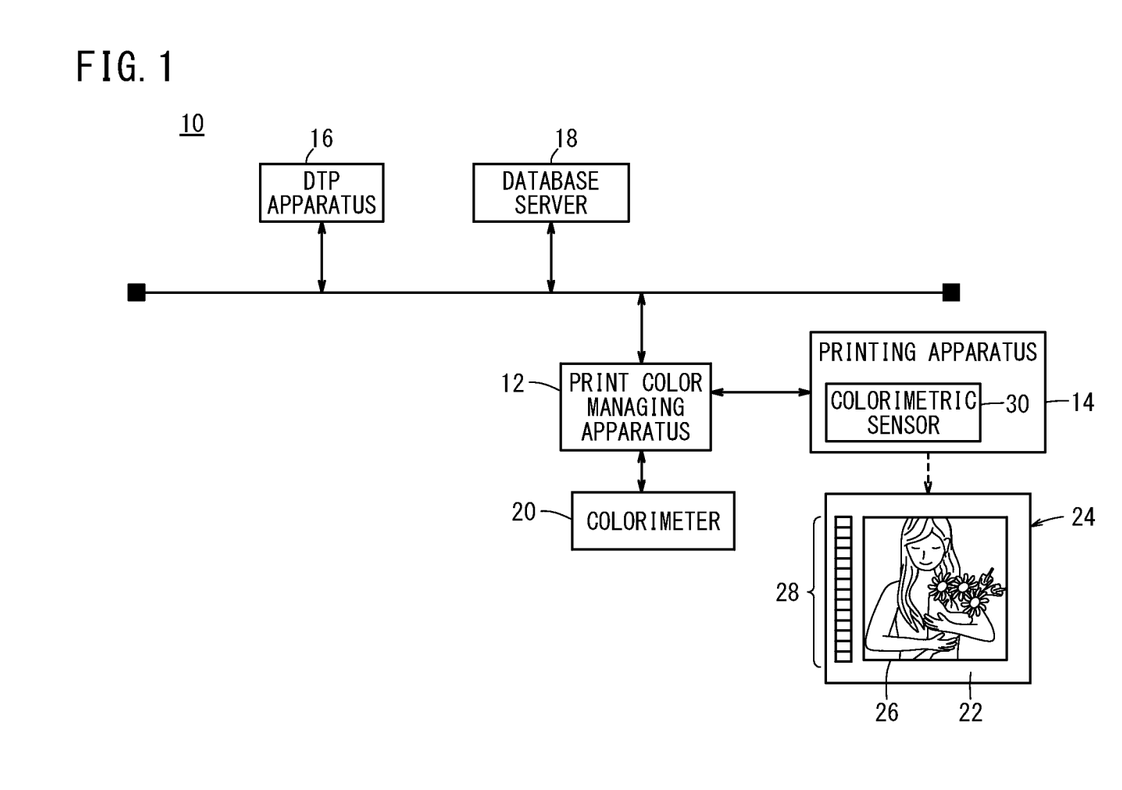
FIG. 1 is a block diagram of a printing system, which incorporates therein a print color managing apparatus according to an embodiment of the present invention.

FIG. 1 is a block diagram of a printing system 10, which incorporates therein a print color managing apparatus 12 according to an embodiment of the present invention.

As shown in FIG. 1, the printing system 10 basically includes a print color managing apparatus 12, a printing apparatus 14, a DTP (Desktop Publishing) apparatus 16, and a database server 18. The print color managing apparatus 12, the DTP apparatus 16, and the database server 18 are electrically connected to each other through wireless links.

The print color managing apparatus 12 converts various data (a device color signal or page description data) input from an external apparatus into a device color signal suitable for a printing process carried out by the printing apparatus 14. The print color managing apparatus 12 outputs the produced device color signal to the printing apparatus 14. The device color signal represents image data defined as device-dependent data, and may, for example, be raster-format data (TIFF, bitmap, RAW, etc.) having four color channels (CMYK) or three color channels (RGB). The device color signal, which is supplied to the printing apparatus 14, may alternatively be unique format data with a header added thereto.

Figure 3:
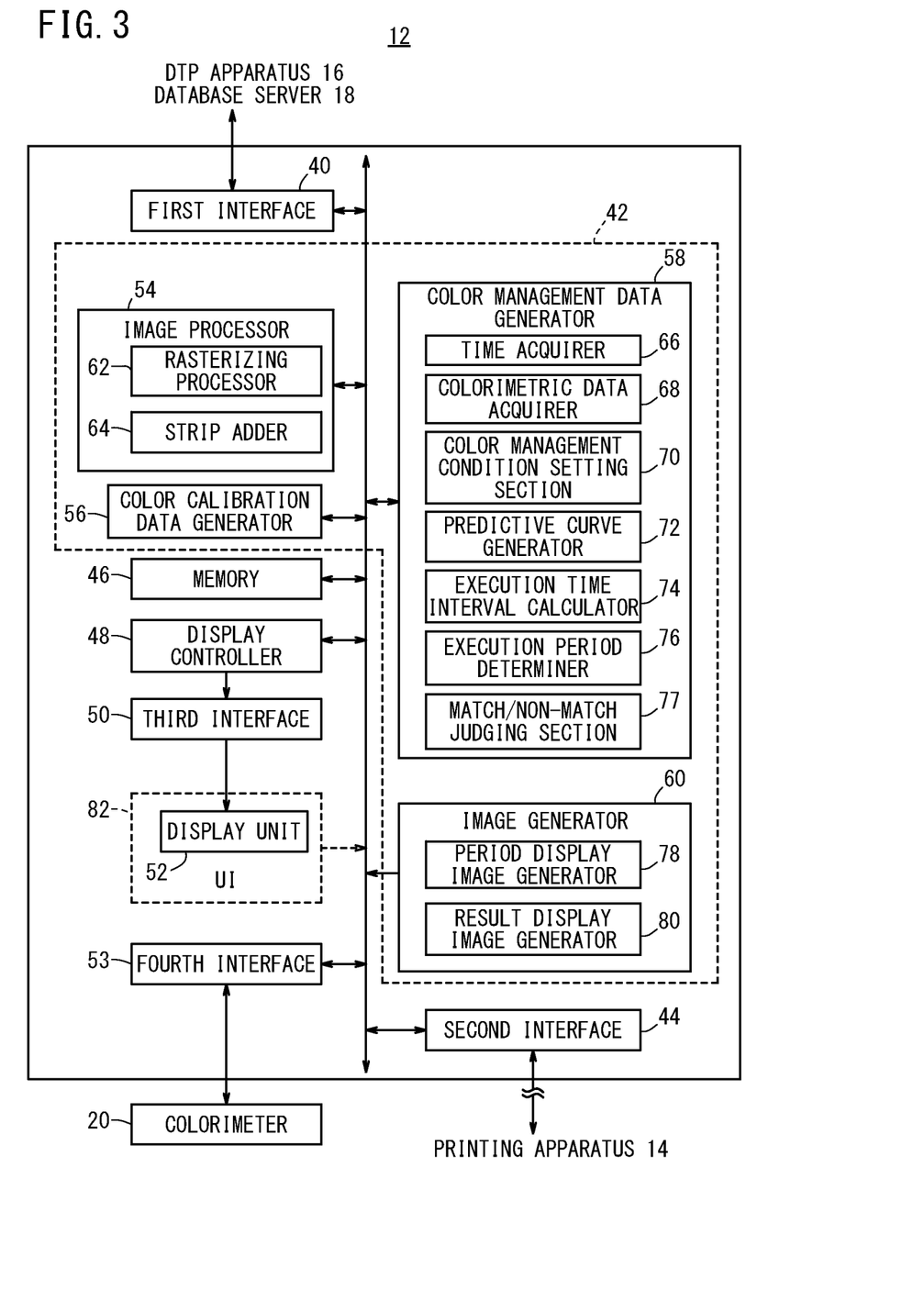
FIG. 3 is a block diagram of an electric configuration of the print color managing apparatus shown in FIG. 1.

A colorimeter 20 for measuring color values of an object is connected to the print color managing apparatus 12 through a fourth interface 53 (see FIG. 3). The color values include not only tristimulus values X, Y, Z, the coordinates L*, a*, b of a uniform color space, etc., but also characteristics of optical physical properties with respect to wavelengths, e.g., a spectral radiance distribution, a spectral sensitivity distribution, a spectral reflectance, or a spectral transmittance. Color values acquired by colorimetric measurements may hereinafter be referred to as "colorimetric values".

The printing apparatus 14 is electrically connected to the print color managing apparatus 12 through a serial interface, such as a USB (Universal Serial Bus) cable, an IEEE1394 cable, an Ethernet (registered trademark) cable, a wireless network, or the like, or a parallel interface such as a Centronics cable.

The printing apparatus 14 is a device for forming an image on a medium 22. The printing apparatus 14 may be a proofer for offset printing, or a digital printing press for direct printing. If the printing apparatus 14 is a proofer, it may be a DDCP (Direct Digital Color Proofer) having the same printing capability as an offset printing press, a low-resolution electrophotographic color laser printer, an ink jet printer, or the like. If the printing apparatus 14 is a digital printing press, the printing apparatus 14 may be an ink jet color proofer, an electrophotographic color laser printer, or the like.

The medium 22 may comprise a paper medium such as synthetic paper, thick paper, aluminum-evaporated paper, or the like, a resin medium such as vinyl chloride, PET, or the like, or tarpaulin paper, or the like. The print 24 produced by the printing apparatus 14 includes a finished area 26, which serves as an actual image area after marginal edges are cut off, and a control strip 28 on one of the cut off marginal edges.

The printing apparatus 14 includes a colorimetric sensor 30 for colorimetrically measuring the color values of an object. The colorimetric sensor 30 has a detecting surface (not shown) oriented toward the image-forming area (on the side of the finished area 26) of the medium 22. While the medium 22 is fed by a medium feeder (not shown), the colorimetric sensor 30 of the printing apparatus 14 is capable of colorimetrically measuring the colors of an image, i.e., the control strip 28, on the medium 22.

The DTP apparatus 16 is capable of editing data of a material (content) made up of characters, figures, pictures, photos, etc. The DTP apparatus 16 generates electronic manuscripts in a page description language (hereinafter referred to as "PDL") by laying material data on each page. PDL refers to a language which is descriptive of image information, including format information, positional information, color information (including density information), etc., of characters, figures, etc., in a "page" that serves as an output unit for printing, displaying, or the like. The DTP apparatus 16 performs a rasterizing process on electronic manuscripts represented by means of PDL format data. The rasterizing process includes a data format conversion process for converting PDL format data into a raster format, and a color conversion process using an ICC (International Color Consortium) profile.

The database server 18 is an apparatus for managing data such as job tickets of electronic manuscripts, e.g., JDF (Job Definition Format) files, color sample data, target profiles, or device profiles suitable for a combination of the printing apparatus 14 and the medium 22. The database server 18 may manage colorimetric data, to be described later, acquired via the print color managing apparatus 12.

Figure 2A:
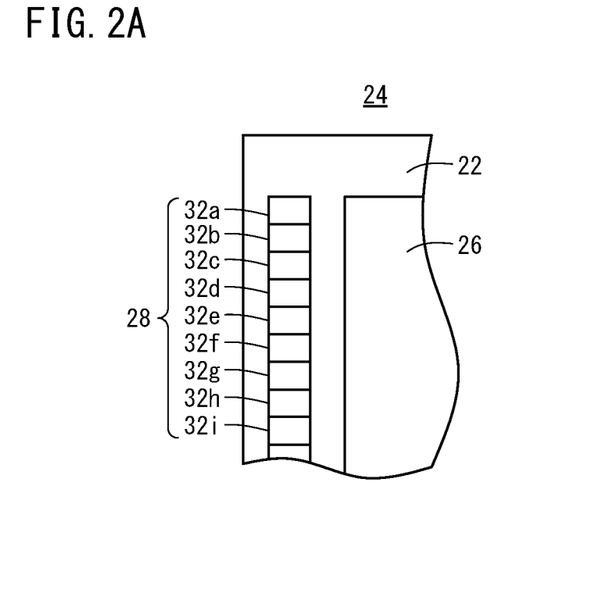
FIG. 2A is an enlarged fragmentary view of a print shown in FIG. 1.

FIG. 2A is an enlarged fragmentary view of the print 24 shown in FIG. 1.

As shown in FIG. 2A, the control strip 28, which is printed on the left marginal edge of the medium 22, includes a plurality of identically shaped color patches of different colors. In FIG. 2A, the control strip 28 is shown as including as color specimens at least nine color patches 32a through 32i. The color patches 32a through 32i are arranged without gaps therebetween along a vertical direction, i.e., the direction in which the medium 22 is fed.

Figure 2B:
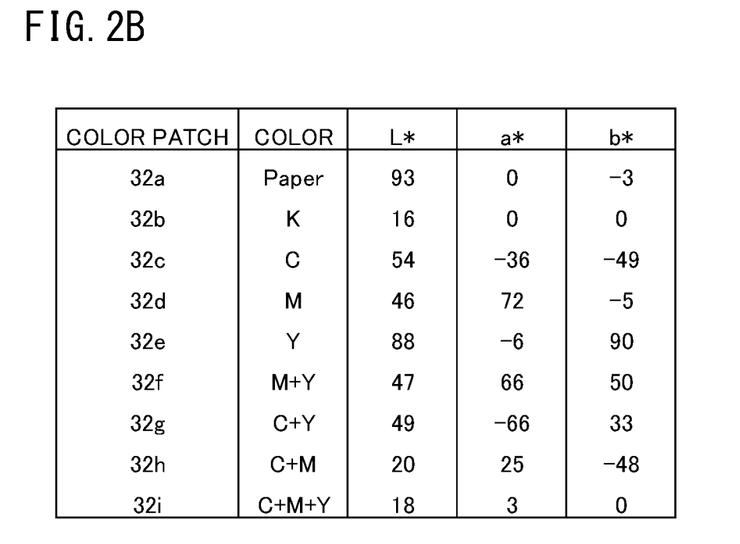
FIG. 2B is a diagram showing a design example of colors of color patches shown in FIG. 2A.

FIG. 2B is a diagram showing a design example of colors of the color patches 32a through 32i shown in FIG. 2A. FIG. 2B shows reference values prescribed by ISO12647-2. For example, the color patch 32a has reference values L*=93, a*=0, b*=−3 for colors in an unprinted area (paper), and the color patch 32f has reference values L*=47, a*=66, b*=50 for secondary colors (M+Y) of M and Y.

The reference values should preferably be color values that are not dependent on input and output devices (so-called device-independent data). More specifically, the reference values may be color values according to a color system such as HSV (Hue-Saturation-Value), HLS (Hue-Lightness-Saturation), CIELAB, CIELUV, XYZ, or the like.

FIG. 3 is a block diagram of an electric configuration of the print color managing apparatus 12 shown in FIG. 1.

As shown in FIG. 3, the print color managing apparatus 12 includes a first interface 40, a controller 42, a second interface 44, a memory (recording medium) 46, a display controller 48, a third interface 50, a display unit 52, and a fourth interface 53. The memory 46 stores programs and data for controlling a CPU (not shown) in order to perform the functions of the print color managing apparatus 12.

The first interface 40 serves to send electric signals to and receive electric signals from external apparatus, including the DTP apparatus 16 and the database server 18. For example, the first interface 40 acquires various data (device color signals, PDL data) edited and generated by the DTP apparatus 16, and also acquires various data managed and saved by the database server 18.

The second interface 44 serves to send electric signals to and receive electric signals from external apparatus including the printing apparatus 14. For example, the second interface 44 supplies device color signals generated in the print color managing apparatus 12, and acquires colorimetric data acquired by the colorimetric sensor 30 (see FIG. 1).

The controller 42, which comprises an information processor such as a CPU or the like, functions as an image processor 54, a color calibration data generator 56, a color management data generator 58, and an image generator 60.

The image processor 54 includes a rasterizing processor 62 having the same rasterizing function as the DTP apparatus 16 (see FIG. 1), and a strip adder 64 for adding an image representing the control strip 28 in a cut-off area of the print 24.

The color calibration data generator 56 generates various data for a color calibration process. The term "calibration" as used herein refers to a concept covering not only regeneration of an ICC profile, but also correction of a color conversion LUT (tone curve).

The color management data generator 58 includes a time acquirer 66 for acquiring a certain time (hereinafter referred to as a "printing time") in a process for producing the print 24, a colorimetric data acquirer (colorimetric value acquirer) 68 for acquiring colorimetric data for use in color monitoring, a color management condition setting section 70 for setting color management conditions concerning management of color accuracy in the printing apparatus 14, a predictive curve generator 72 for generating a predictive curve for predicting color variation characteristics based on the aforementioned colorimetric data, an execution time interval calculator 74 for calculating an execution time interval TI based on the predictive curve, an execution period determiner 76 for determining a recommended execution period RP for a calibration process based on the execution time interval TI, and a match/nonmatch judging section 77 for determining whether or not at least one colorimetric value acquired by the colorimetric data acquirer 68 matches the color management conditions set by the color management condition setting section 70.

The execution time interval TI refers to an interval between execution times for calibrating the printing apparatus 14. The recommended execution period RP refers to a period (time interval) during which the printing apparatus 14 is calibrated. The recommended execution period RP is presented to the user of the printing apparatus 14. Since the recommended execution period RP is merely a recommended value, it is immaterial whether the printing apparatus 14 is calibrated or not according to the recommended execution period RP.

The image generator 60 includes a period display image generator 78 for generating a period display image (period display field 112 shown in FIG. 7), which displays the recommended execution period RP determined by the execution period determiner 76, and a result display image generator 80 for generating a result display image (result display field 136 in FIG. 10), which includes the visual judgment results produced by the match/non-match judging section 77.

The memory 46 stores therein a plurality of target profiles and a device profile suitable for the printing apparatus 14. The memory 46 may also store colorimetric data for each of various printing apparatus 14, and various other items of information for carrying out the print color managing method according to the present invention.

The display controller 48 sends display screen images generated by the image generator 60 to the display unit 52 via the third interface 50, in order to display the display screen images on the display unit 52. The display function of the display unit 52 and the input function of a pointing device (not shown) jointly make up a user interface (UI) 82.

The print color managing apparatus 12 according to the present embodiment is basically constructed as described above. A first operation sequence and a second operation sequence of the print color managing apparatus 12 will be described below, mainly with reference to FIGS. 3 through 10. The first operation sequence refers to an operation sequence for producing a print 24 with a control strip 28 (FIGS. 1 and 2A) added thereto, whereas the second operation sequence refers to an operation sequence for determining the recommended execution period RP.

The first operation sequence will be described below with reference to FIGS. 4 and 5.

Figure 4:
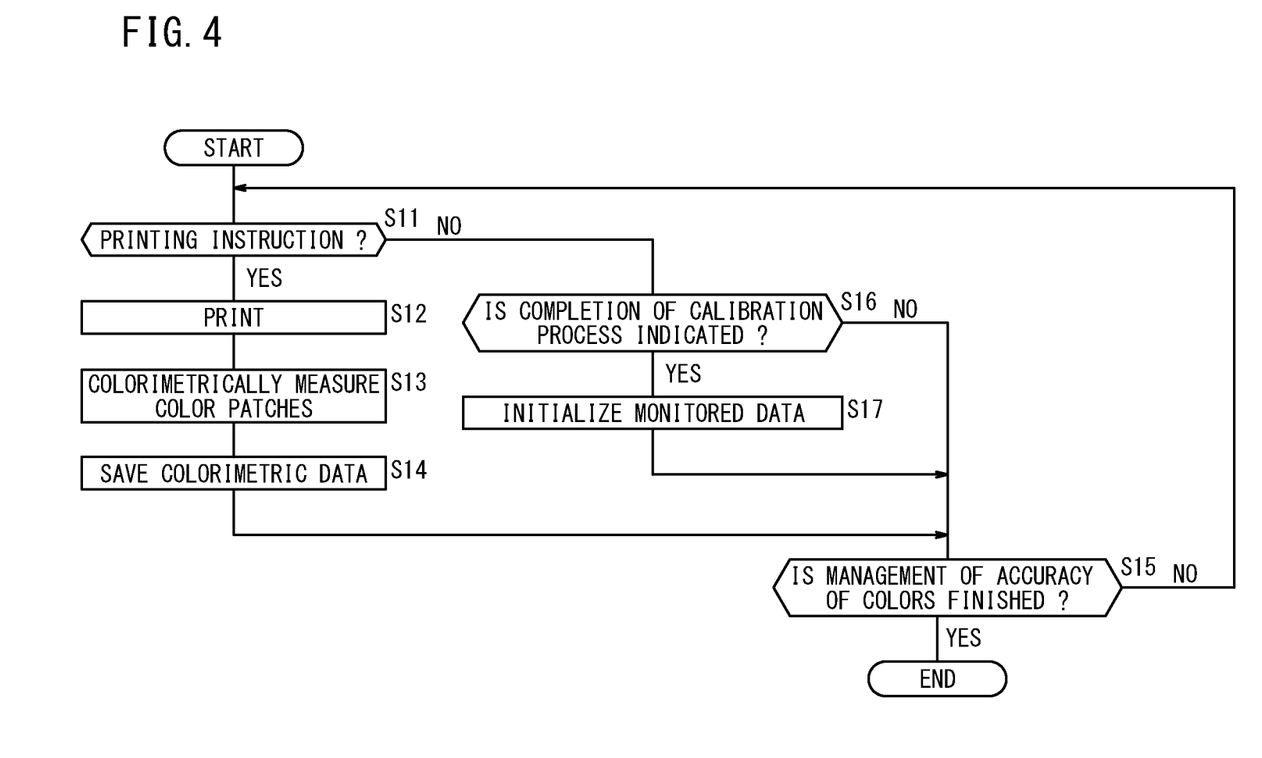
FIG. 4 is a flowchart of a first operation sequence for producing a print with a control strip added thereto.

First, in step S11 shown in FIG. 4, the printing apparatus 14 confirms whether or not there is a printing instruction for producing the print 24. The printing instruction may be generated by an input action made on the UI 82, or may be based on a control signal supplied from an external apparatus, e.g., the DTP apparatus 16.

If there is a printing instruction, then in step S12, the print color managing apparatus 12 controls the printing apparatus 14 to produce a print 24. Details of step S12 will be described below.

The rasterizing processor 62 performs a desired rasterizing process on various data that have been input from the DTP apparatus 16 via the first interface 40. If device color signals are input directly to the first interface 40, then a rasterizing process is not required to be performed on the device color signals.

Figure 6:
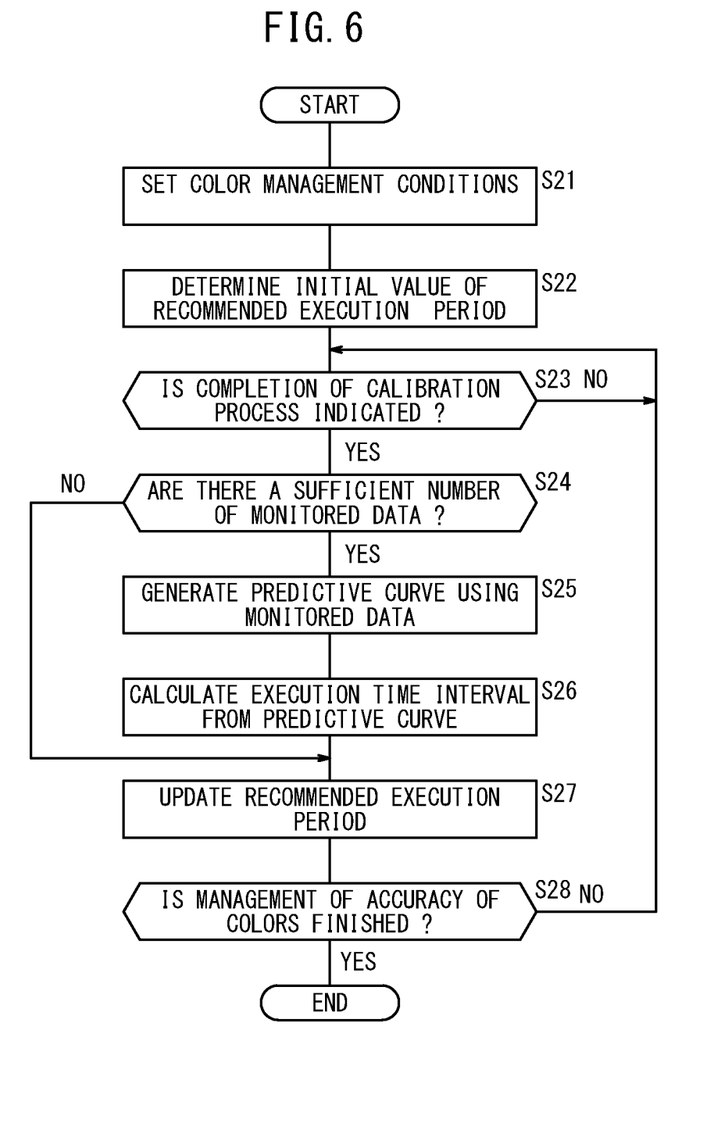
FIG. 6 is a flowchart of a second operation sequence for determining a recommended execution period for a calibration process.

The strip adder 64 adds the image of a control strip 28 to an area (e.g., a cut-off area) outside of the finished area 26 of the acquired raster-format data. At this time, the strip adder 64 converts the reference values (L*a*b*) of the color patches 32a through 32i shown in FIG. 2B into device color signals using a device profile depending on a combination of the printing apparatus 14 and the medium 22, thereby calculating colors of the image. The reference values are predetermined depending on color management conditions, which are set in step S21, to be described later, as shown in FIG. 6.

Thereafter, the print color managing apparatus 12 supplies the device color signals, which have been processed by various image processing techniques, to the printing apparatus 14 via the second interface 44. The printing apparatus 14 then produces an image based on the supplied device color signals. More specifically, the printing apparatus 14 forms a desired image in the finished area 26, and a control strip 28 in a cut-off area, which extends along the direction in which the medium 22 is fed.

Then, in step S13, the colorimetric sensor 30 (see FIG. 1) colorimetrically measures the color patches 32a through 32i on the medium 22. More specifically, while the medium 22 is fed by a medium feeder (not shown), the colorimetric sensor 30 colorimetrically measures the color patches 32a through 32i at given time intervals in order to acquire a plurality of detected values as time-sequence data. The colorimetric sensor 30 acquires colorimetric data (colorimetric values) of the color patches 32a through 32i by analyzing the time-sequence data.

Then, in step S14, the controller 42 stores the acquired colorimetric data in the memory 46. The printing apparatus 14 sends the colorimetric data acquired from the colorimetric sensor 30 to the print color managing apparatus 12 via the second interface 44. The time acquirer 66 acquires the print time of the print 24 from time information acquired with an appropriate timing. The controller 42 stores the colorimetric data in the memory 46 in association with the print time of the print 24. The time information may comprise information for identifying the time at which the printing instruction was received, times at which the various image processing functions were carried out, the time at which the transmission of the device color signals was completed, and the time at which the colorimetric data were acquired. The print color managing apparatus 12 may also send the colorimetric data to the database server 18. In other words, the colorimetric data may be stored and managed by the database server 18, rather than the print color managing apparatus 12.

Then, in step S15, the color management data generator 58 determines whether or not management of accuracy of the colors of the print 24 is finished. If management of accuracy of the colors is not finished, but should be continued, then control returns to step S11, and steps S11 through S14 are repeated. Accordingly, each time a print 24 is produced, colorimetric data of the color patches 32a through 32i are accumulated, thereby producing a data sequence representative of color variation characteristics which vary with time. Colorimetric data at a plurality of print times will hereinafter be referred to also as "monitored data".

Figure 5:
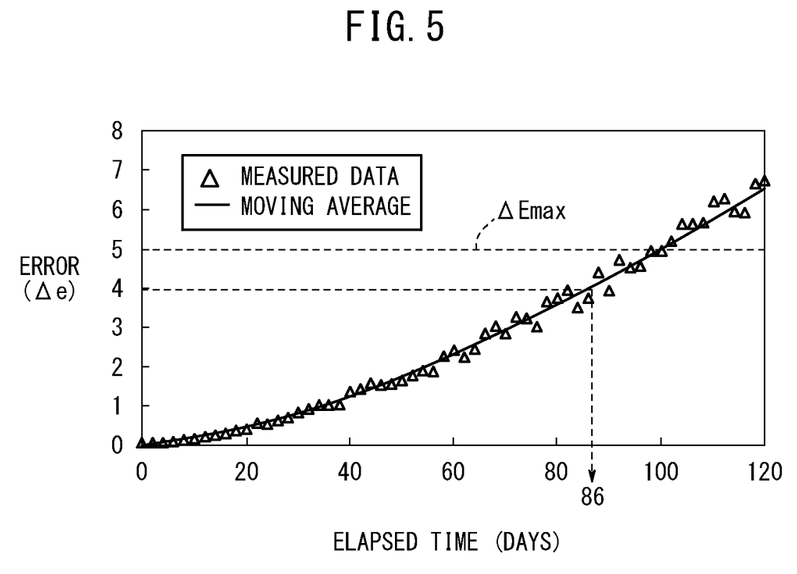
FIG. 5 is a graph showing an example of color variation characteristics of one color patch.

FIG. 5 is a graph showing an example of color variation characteristics of one color patch 32i. The graph has a horizontal axis representing the time (in units of days) that has elapsed from the calibration process that was carried out last, and a vertical axis representing the color difference between the reference values (see FIG. 2B) of the color patch 32i and measured values, i.e., an error Δe. Each triangular mark represents a plotted measurement value, i.e., monitored data. The solid-line curve represents a moving average, which is calculated by averaging values of the monitored data within a given time range and then smoothing the averaged value.

In FIG. 5, the elapsed time 0 (day) signifies a time at which the calibration process is carried out. Immediately after the calibration process is carried out, the error Δe is extremely small and essentially nil. As time elapses, the error Δe gradually becomes greater due to an error factor on account of the printing apparatus 14. The error factor depends on an image recording process employed by the printing apparatus 14, individual unit properties of the printing apparatus 14, and the environment in which the printing apparatus 14 is installed, etc.

The printing apparatus 14 with the built-in colorimetric sensor 30 is capable of monitoring color variation characteristics by automatically acquiring and storing colorimetric data from time to time. If the printing apparatus 14 does not contain the built-in colorimetric sensor 30, then the colorimeter 20, which is connected to the print color managing apparatus 12, may be used to acquire colorimetric data. At this time, the acquired colorimetric data should preferably be recorded in association with the print time. If the print time and the time at which the colorimetric data are acquired are substantially the same as each other, then the acquired colorimetric data may be recorded in association with the time at which the colorimetric data are acquired.

It is not necessary to colorimetrically measure the control strips 28 of all of the prints 24 that are produced. Rather, the control strips 28 of the prints 24 may be colorimetrically measured according to predetermined rules, e.g., at given time intervals, or each time a certain number of prints 24 have been produced.

In step S11 of FIG. 4, if there is no printing instruction, then in step S16, the print color managing apparatus 12 confirms whether or not completion of the calibration process is indicated. If the print color managing apparatus 12 confirms that completion of the calibration process is not indicated, then control returns to step S11. If the print color managing apparatus 12 confirms that completion of the calibration process is indicated, then in step S17, the print color managing apparatus 12 initializes the monitored data stored in the memory 46. More specifically, the print color managing apparatus 12 assumes that the error $\Delta e$ is reset to 0 by the calibration process. Thereafter, in the same manner as before, the monitored data are initialized, the print color managing apparatus 12 acquires colorimetric data after the present calibration process, and the print color managing apparatus 12 monitors color variation characteristics.

The calibration process may be carried out based on an instruction from the UI 82 (manual calibration process), or may automatically be carried out if the colorimetric values of the color patches 32a through 32i are judged as exceeding an allowable error (automatic calibration process).

As described above, the print 24 with the control strip 28 added thereto is produced, and monitored data of the color patches 32a through 32i are acquired in the first operation sequence.

A second operation sequence will be described below with reference to FIGS. 6 through 10. FIG. 6 is a flowchart of the second operation sequence for determining a recommended execution period RP for a calibration process.

First, in step S21, the color management condition setting section 70 sets color management conditions concerning management of color accuracy in the printing apparatus 14. The color management conditions include at least one of measuring conditions for acquiring colorimetric values and judging conditions for judging whether or not the colorimetric values are appropriate. For example, the color management conditions may be various items, including the type of colorimeter 20, the type of control strip 28, a reference value, an allowable error, a management width, etc.

In response to an action from the user, the image generator 60 generates an image of a window 100 (see FIG. 7) for setting measuring conditions and for judging conditions for the colors of the control strip 28. The period display image generator 78 also generates a period display image (period display field 112 in FIG. 7), which displays the recommended execution period RP determined by the execution period determiner 76. The display controller 48 displays the image generated by the image generator 60 on the display unit 52.

Figure 7:
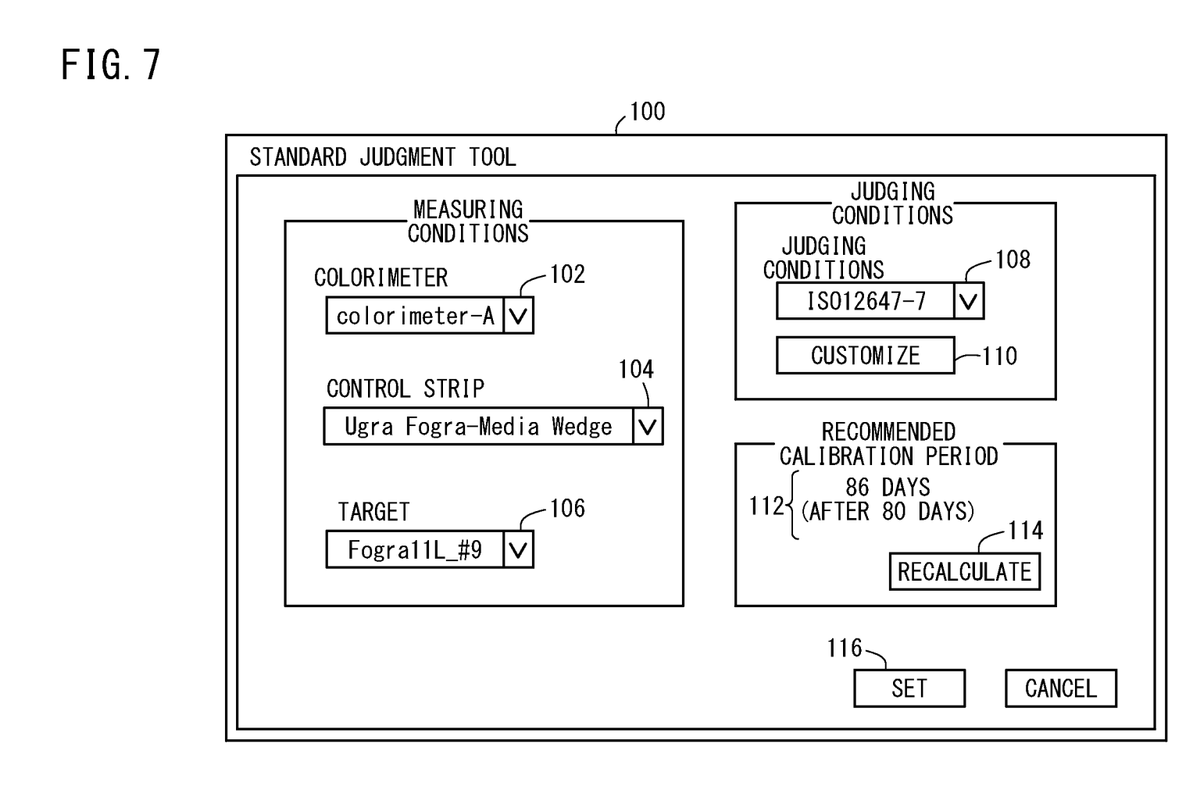
FIG. 7 is a view showing by way of example an image for setting measurement and judgment conditions.

As shown in FIG. 7, the window 100 includes a first entry area 102, a second entry area 104, a third entry area 106, fourth entry areas 108 and 110, a period display field 112, a button 114 designated by "RECALCULATE", and a button 116 designated by "SET".

The first entry area 102 enters the type of colorimeter 20 for colorimetrically measuring the control strip 28 in response to an action from the user. The type of colorimeter 20 includes not only the type name and a registered unique name therefor, but also information as to whether or not colorimetric values measured by the colorimetric sensor 30 should be used if the printing apparatus 14 incorporates the colorimetric sensor 30 therein.

The second entry area 104 enters the type of control strip 28 in response to an action from the user. The type of control strip 28 includes "Ugra Fogra-Media Wedge CMYK V3.0a", "IDEAlliance ISO 12647-7", or the like, for example.

The third entry area 106 enters the type of color patches 32a through 32i to be used for monitoring colors in response to an action from the user. The type of color patches 32a through 32i may represent a color value or a specific number such as "9TH" (color patch 32i) of the control strip 28 selected in the second entry area 104.

The fourth entry area 108 enters judging conditions for colors of the control strip 28 in response to an action from the user. The judging conditions include not only standard types such as "ISO 12647-7", "ISO 12647-8", etc., but also use of the print 24 such as digital printing, contact proof, or the like, together with the user's own judgment conditions (custom). If the user wishes to change the judgment conditions freely in a customizing fashion, then the user clicks on the fourth entry area 110. If the fourth entry area 110 is clicked on, a window (not shown) is called up, which allows the user to change the reference value, the allowable error, and the management width, e.g., in order to change the allowable error within 75% thereof.

Then, in step S22, the execution period determiner 76 determines an initial value of the recommended execution period RP based on the color management conditions set in step S21. More specifically, in response to the user clicking on the "SET" button 116 (see FIG. 7), the color management condition setting section 70 acquires color management conditions from the UI 82, and sets the acquired color management conditions. Then, the execution period determiner 76 determines a recommended execution period RP as an initial value, based on the color management conditions set by the color management condition setting section 70.

Alternatively, the execution period determiner 76 may determine a recommended execution period RP depending on usage of the printing apparatus 14 and/or types of standards. In this manner, the execution period determiner 76 can determine a recommended execution period RP suitable for a given level of management accuracy (required specifications of color reproducing characteristics), which differs depending on the type and attributes of the print 24. Further, alternatively, the execution period determiner 76 may determine a recommended execution period RP by referring to a table, which associates combinations of items of the color management conditions shown in FIG. 7 with recommended execution periods RP.

For example, it is assumed that the color management conditions, which have been set, require that "the value of the error $\Delta e$ fall within 80% of an allowable color difference $\Delta E_{max}$ in the moving average of the monitored data". As shown in FIG. 5, if $\Delta E_{max}=5$, then the execution period determiner 76 determines a time width corresponding to $\Delta e=4$ (i.e., RP=86 days) as a recommended execution period RP.

In this manner, in step S22, the execution period determiner 76 determines an initial value of the recommended execution period RP.

Immediately after the printing apparatus 14 has been installed in a given facility, no monitored data exist, because the printing apparatus 14 has produced almost no prints at this time. In this case, the execution period determiner 76 may determine a default value, which is related to the set color management conditions, as a recommended execution period RP.

The period display field 112 shown in FIG. 7 displays the recommended execution period RP (86 DAYS), which was determined in step S22, and a remaining time (AFTER 80 DAYS) calculated from the time that the recommended execution period RP will expire. In response to the user clicking on the "RECALCULATE" button 114, the value of a recommended execution period RP, which is recalculated by the execution period determiner 76, may be displayed in the period display field 112 so as to update the existing value.

Then, in step S23, the color management data generator 58 determines whether or not completion of the calibration process is indicated. If the color management data generator 58 decides that completion of the calibration process is not indicated, then control waits until completion of the calibration process has been indicated.

If the color management data generator 58 decides that completion of the calibration process is indicated, then in step S24, the colorimetric data acquirer 68 acquires the monitored data stored in the memory 46 (or the database server 18), and determines whether or not there are a sufficient number of monitored data.

If the colorimetric data acquirer 68 decides that there are a sufficient number of monitored data, then in step S25, the predictive curve generator 72 generates a predictive curve based on the monitored data acquired by the colorimetric data acquirer 68.

Figure 8:
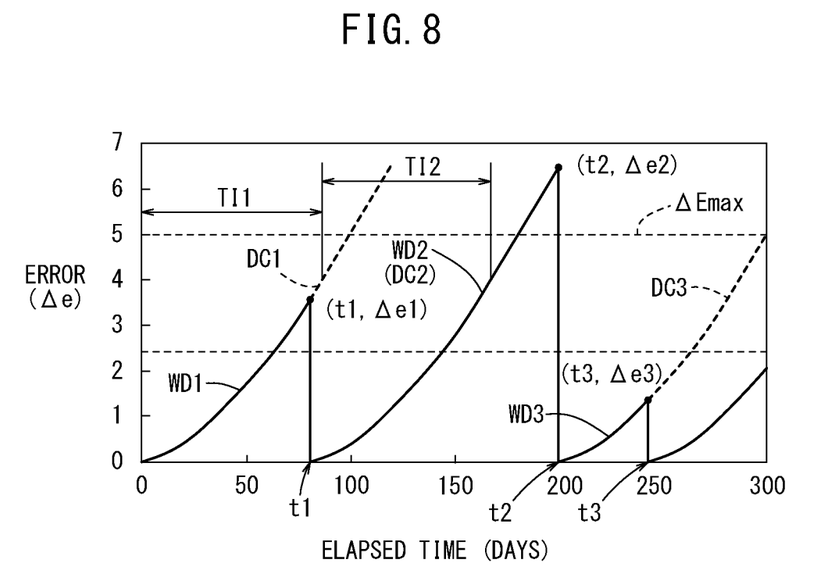
FIG. 8 is a graph showing an example of color variation characteristics of one color patch.

FIG. 8 is a graph showing an example of color variation characteristics of one color patch 32*i*. FIG. 8 shows color variation characteristics over a period longer than the period shown in FIG. 5, measured in a case where three calibration processes were carried out at execution times of t1=80, t2=200, and t3=240. For illustrative purposes, only moving average curves are shown, the individual colorimetric data being omitted from illustration.

If a time elapses from 0 (day) to t1 (day), the printing apparatus 14 is operated with no calibration process being performed, and colorimetric data are successively accumulated, thereby producing monitored data WD1 (indicated by the solid line) with end points (0, 0) and (t1, Δe1). The predictive curve generator 72 then generates a predictive curve DC1 (indicated by the broken line) based on the monitored data WD1.

The predictive curve DC1 may be represented by any of various functions, including a linear function, a polynomial function, an exponential function, a logarithmic function, and a power function. Various parameters for identifying the shape of the function may be determined by known optimizing processes, such as a least-square method, a steepest descent method, Newton's method, a quasi-Newton's method, and a simplex method.

As described later, since a recommended execution period RP is determined from the predictive curve DC1 generated in step S25, the recommended execution period RP can be stably calculated regardless of repetitive variations (error factor) without directly using the monitored data WD1.

Then, in step S26, the execution time interval calculator 74 calculates an execution time interval TI1 from the predictive curve DC1 that was generated by the predictive curve generator 72. In the example shown in FIG. 8, the execution time interval calculator 74 calculates the coordinates of a point of intersection between the predictive curve DC1 and Δe=4 as coordinates (4, 86). The execution time interval calculator 74 thus calculates an execution time interval TI1=86. Then, the controller 42 stores the execution time interval TI1 calculated by the execution time interval calculator 74 in the memory 46.

In step S27, the execution period determiner 76 determines a recommended execution period RP, and if necessary, updates the recommended execution period. For example, the execution period determiner 76 may calculate a recommended execution period RP based on the execution time interval TI calculated by the execution time interval calculator 74.

In step S28, the color management data generator 58 determines whether or not management of accuracy of the colors of the print 24 is finished. If management of accuracy of the colors is not finished, but should be continued, then control returns to step S23, and steps S23 through S27 are repeated for a second cycle.

As shown in FIG. 8, if time elapses from t1 (day) to t2 (day), the printing apparatus 14 is operated with no calibration process being performed thereon, and colorimetric data are successively accumulated, thereby producing monitored data WD2 (indicated by the solid line) with end points (t1, 0) and (t2, Δe2).

In step S25, in the second cycle, since Δe2>ΔEmax is satisfied, the predictive curve generator 72 can use the monitored data WD2 as a predictive curve DC2.

In step S26, in the second cycle, the execution time interval calculator 74 calculates an execution time interval TI2 from the predictive curve DC2, which was generated by the predictive curve generator 72. The execution time interval calculator 74 calculates the coordinates of a point of intersection between the predictive curve DC2 and Δe=4 as coordinates (4, 172). The execution time interval calculator 74 thus calculates an execution time interval TI2=172−86=86.

If time elapses from t2 (day) to t3 (day), the printing apparatus 14 is operated with no calibration process being performed, and colorimetric data are successively accumulated, thereby producing monitored data WD3 (indicated by the solid line) with end points (t2, 0) and (t3, Δe3).

There may be occasions in which the elapsed time is short, e.g., t3−t2=40 days, and the accuracy of prediction based on the predictive curve DC3 is not sufficient. For example, in step S24, in a third cycle, the colorimetric data acquirer 68 may determine whether or not a sufficient number of monitored data exists based on the relationship between the magnitude of the error Δe and a given threshold value. In the example shown in FIG. 8, a value (Δe=2.5) corresponding to 50% of the allowable error ΔEmax is determined as the threshold value. However, the threshold value may be determined in other ways.

Since the error Δe3<2.5 is satisfied in the example shown in FIG. 8, the colorimetric data acquirer 68 decides that a sufficient number of monitored data WD3 does not exist, and steps S25, S26 are skipped. In other words, an execution time interval TI is not calculated at the execution time t3, and a new color monitoring process is started.

By thus taking into account execution time intervals TI that have successively been acquired, it is possible to determine and update an execution period depending on the current printing capability of the printing apparatus 14. An example in which the execution period determiner 76 determines a recommended execution period RP will be described below.

Figure 9:
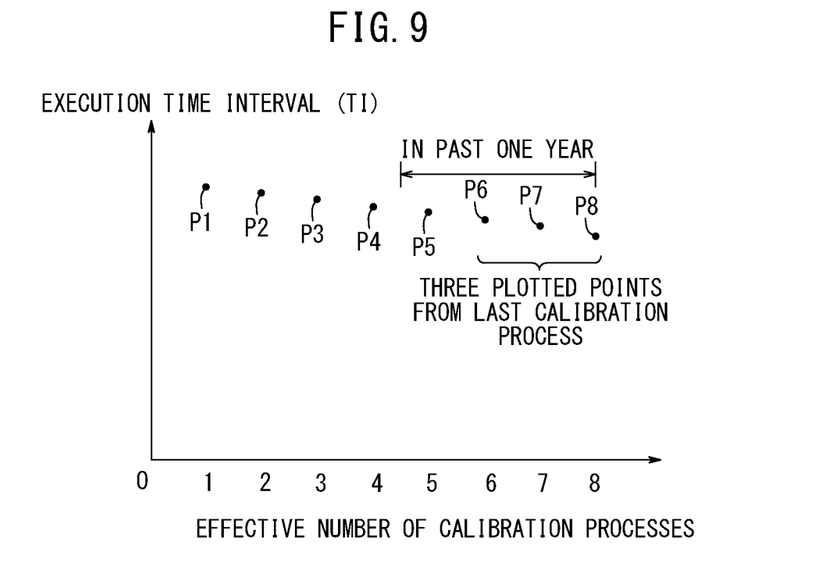
FIG. 9 is a graph showing examples of a process of determining a recommended execution period for carrying out a calibration process.

FIG. 9 is a graph showing examples of a process of determining a recommended execution period RP. It is assumed that a total of eight calibration processes have been judged as effective, and that respective execution time intervals TI (plotted points P1 through P8) of the calibration processes have been acquired. The plotted point P1 which is closest to the origin of the graph represents the oldest execution time.

As the plotted point becomes farther from the origin of the graph, the plotted point becomes closer to the most recent execution time.

According to a first example, the execution period determiner 76 selects plotted points P5 through P8 within a given period (one year in FIG. 9), dating back from the time of the last calibration process (corresponding to the plotted point P8), and determines the average value of the selected plotted points P5 through P8 as a new recommended execution period RP.

According to a second example, the execution period determiner 76 selects a certain number (three, for example) of plotted points P6 through P8 from the time of the last calibration process, and determines the average value of the selected plotted points P6 through P8 as a new recommended execution period RP.

Alternatively, the execution period determiner 76 may determine a recommended execution period RP according to any of various other processes. The execution period determiner 76 may calculate a recommended execution period RP according to any of various statistical processes, including a maximum value, a minimum value, a central value, a most frequent value, etc., rather than the average value.

In addition to the one color patch 32*i*, other color patches 32*a* through 32*h* may also be monitored for colors thereof according to the same or different processes. For example, a color patch with a relatively large color variation may be selected, or a color patch with a large error Δe immediately after the calibration process may be selected.

A calibration process can be carried out based on a recommended execution period RP thus determined and updated.

For the automatic calibration process, the time acquirer 66 calculates a time that has elapsed from the execution time of the last calibration process. If the calculated time is judged as exceeding the recommended execution period RP, then the automatic calibration process is carried out.

For the manual calibration process, the user refers to information within the period display field 112, as shown in FIG. 7. If necessary, the user manually performs the calibration process. Upon elapse of the recommended execution period RP, the window 100 may display a corresponding warning.

Actual colorimetric results or judgment results of the control strip 28 may be displayed as a list on the display unit 52. More specifically, the match/non-match judging section 77 determines whether or not the colorimetric data acquired by the colorimetric data acquirer 68 match the color management conditions set by the color management condition setting section 70. The image generator 60 then generates an image of a window 130 (see FIG. 10) for displaying judgment results from the match/non-match judging section 77. The result display image generator 80 generates a judgment display image (i.e., the result display field 136 shown in FIG. 10) using the judgment results from the match/non-match judging section 77. The display controller 48 displays the image generated by the image generator 60 on the display unit 52.

Figure 10:
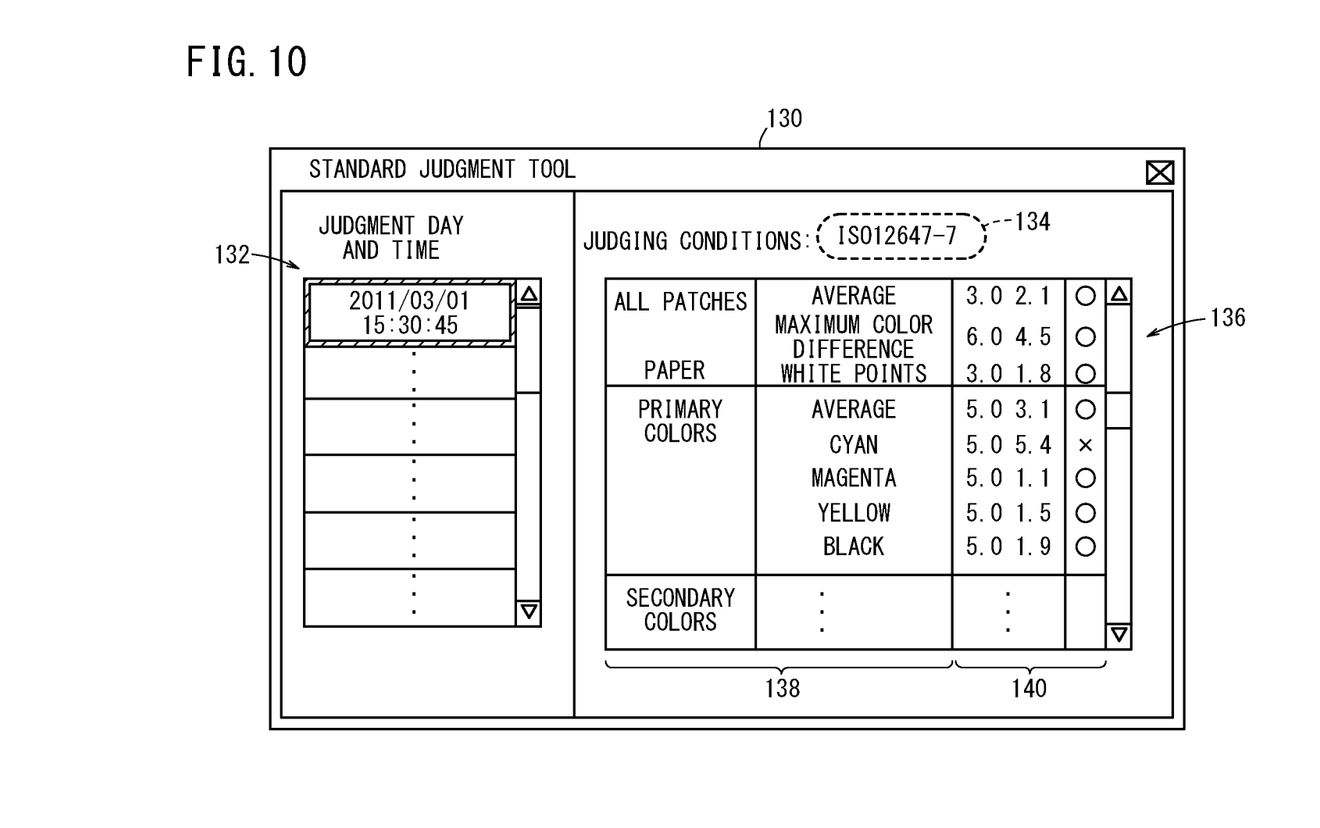
FIG. 10 is a view showing by way of example an image for visual judgment results.

As shown in FIG. 10, the window 130 includes a time display field 132 for displaying a history of times at which the control strip 28 was colorimetrically measured (or at which matching or non-matching thereof was judged), a condition display field 134 for displaying presently set judgment conditions ("ISO 12647-7" in FIG. 10), and a result display field 136 for displaying judgment results concerning the respective color patches 36*a* through 36*i*.

The result display field 136 is made up of a small field 138 for displaying attributes of reference colors (i.e., types of color patches 32*a* through 32*i*) and a small field 140 for displaying target values and measured values for the reference colors and judgment results (○, ×). These small fields 138, 140 allow the user to grasp, at a glance, the state of the printing apparatus 14 at the present time or in the past.

The result display field 136 is not limited to the format shown in FIG. 10, but may be in the form of the graph shown in FIG. 5 or 8. As an alternative to displaying the judgment results by "○" and "×", the judgment results may be indicated by different display colors, or in any other way that allows the user to grasp the judgment results (matching or non-matching) with ease. The result display field 136 may display not only the respective judgment results at each time of printing, but also average judgment results determined at a plurality of printing times.

Since the controller 42 includes the color management condition setting section 70 for setting color management conditions concerning management of color accuracy in the printing apparatus 14, the colorimetric data acquirer 68 for acquiring colorimetric values of the color patches 36*a* through 36*i*, which are printed as color specimens by the printing apparatus 14 in association with the printing time of the color patches 32*a* through 32*i*, and the execution period determiner 76 for determining a recommended execution period RP for a calibration process on the printing apparatus 14 based on a plurality of colorimetric values acquired at a plurality of printing times and the color management conditions that have been set, a rough indication of the execution time for executing a calibration process can be obtained while taking into account the color variation characteristics of the actual print 24. Since an indication not only of whether a calibration process needs to be carried out at present, but also whether a calibration process needs to be carried out in the future is made available to the user, the user finds it highly convenient in planning calibration processes. Accordingly, flexible settings for calibration processes can be provided regardless of the configuration of the printing system 10.

Although certain preferred embodiments of the present invention have been shown and described in detail, it should be understood that various changes and modifications may be made to the embodiments without departing from the scope of the invention as set forth in the appended claims.

What is claimed is:

1. A print color managing apparatus comprising:
a color management condition setting section for setting color management conditions concerning management of color accuracy in a printing apparatus;
a colorimetric data acquirer for acquiring colorimetric values of color patches printed as color specimens by the printing apparatus in association with a printing time of the color patches;
an execution period determiner for determining an execution period for a calibration process on the printing apparatus based on a plurality of colorimetric values, which are acquired at a plurality of printing times by the colorimetric data acquirer, and the color management conditions, which are set by the color management condition setting section;
a period display image generator for generating a period display image, which displays the execution period determined by the execution period determiner,
wherein the period display image generator generates the period display image, which displays a remaining time calculated from a time that the execution period will expire, and
wherein the execution period for a calibration process is a recommended time interval between calibrations of the printing apparatus.

2. The print color managing apparatus according to claim 1, wherein the color management condition setting section sets the color management conditions depending on usage and/or standards of the printing apparatus.

3. The print color managing apparatus according to claim 1, wherein the period display image generator updates the period display image in response to a given operation.

4. The print color managing apparatus according to claim 1, further comprising a display unit for displaying the period display image generated by the period display image generator.

5. The print color managing apparatus according to claim 1, further comprising:
- a match/non-match judging section for determining whether at least one of the colorimetric values acquired by the colorimetric data acquirer matches the color management conditions; and
- a result display image generator for generating a result display image, which includes visual judgment results produced by the match/non-match judging section.

6. The print color managing apparatus according to claim 5, further comprising a display unit for displaying the result display image generated by the result display image generator.

7. The print color managing apparatus according to claim 1, wherein the execution period determiner determines the execution period from predictive curves generated based on the plurality of printing times and the plurality of colorimetric values.

8. The print color managing apparatus according to claim 1, wherein the execution period determiner selects a plurality of time intervals between the executions of the calibrations within a given period, dating back from a time of a last calibration process, and determines the execution period based on the plurality of time intervals according to a statistical process.

9. The print color managing apparatus according to claim 1, wherein the execution period determiner selects a certain number of time intervals between the executions of the calibrations from a time of a last calibration process, and determines the execution period based on the certain number of time intervals according to a statistical process.

10. A print color managing method comprising the steps of:
- setting color management conditions concerning management of color accuracy in a printing apparatus;
- acquiring colorimetric values of color patches printed as color specimens by the printing apparatus in association with a printing time of the color patches; and
- determining an execution period for a calibration process on the printing apparatus based on a plurality of colorimetric values, which are acquired at a plurality of printing times, and the color management conditions, which have been set;
- generating a period display image, which displays the execution period determined by the execution period determiner,
- wherein the period display image displays a remaining time calculated from a time that the execution period will expire, and
- wherein the execution period for a calibration process is a recommended time interval between calibrations of the printing apparatus.

11. A non-transitory recording medium storing a program for managing the accuracy of print colors, the program enabling a computer to function as:
- a color management condition setting section for setting color management conditions concerning management of color accuracy in a printing apparatus;
- a colorimetric data acquirer for acquiring colorimetric values of color patches printed as color specimens by the printing apparatus in association with a printing time of the color patches; and
- an execution period determiner for determining an execution period for a calibration process on the printing apparatus based on a plurality of colorimetric values, which are acquired at a plurality of printing times by the colorimetric data acquirer, and the color management conditions, which are set by the color management condition setting section,
- a period display image generator for generating a period display image, which displays the execution period determined by the execution period determiner,
- wherein the period display image generator generates the period display image, which displays a remaining time calculated from a time that the execution period will expire, and
- wherein the execution period for a calibration process is a recommended time interval between calibrations of the printing apparatus.

* * * * *